United States Patent Office 2,931,805
Patented Apr. 5, 1960

2,931,805
SPIRO [BICYCLO [2.2.1] HEPTANE-2,2'-ALKYLENIMINES]

Joseph Weinstock, Havertown, Pa., assignor to Smith, Kline & French Laboratories, Philadelphia, Pa., a corporation of Pennsylvania No Drawing. Application November 10, 1958
Serial No. 772,685

9 Claims. (Cl. 260—239.3)

This invention relates to new spiro[bicyclo[2.2.1]-heptane-2,2'-alkylenimines] which have useful pharmacodynamic activity in man and animals and to intermediates for preparing them.

More specifically the compounds of this invention have utility as hypotensive and vasodilator agents. The compounds also have local anesthetic and central nervous system activating effects.

The novel spiro[bicyclo[2.2.1]heptane-2,2'-alkylenimines] of this invention are represented by the following structural formula:

FORMULA 1

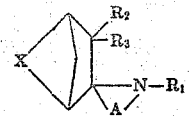

when:

X represents ethylene or vinylene;
$R_1$ represents hydrogen, lower alkyl, benzyl, phenethyl, allyl, cinnamyl, ω-amino-lower alkylene, ω-hydroxy-lower alkylene, ω-acetoxy-lower alkylene, ω-chloro-lower alkylene or ω-bromo-lower alkylene;
$R_2$ and $R_3$ represent hydrogen, methyl, ethyl, cyclopentyl, cyclohexyl, phenyl, methoxyphenyl, hydroxyphenyl, chlorophenyl, aminophenyl or together with the carbon atom to which they are attached form a cyclohexyl or cyclopentyl group, and
A represents an alkylene chain having 3 to 5 carbon atoms.

Advantageous compounds of this invention are represented by the following structural formula:

FORMULA 2

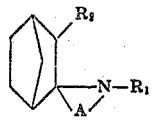

when:

$R_1$ represents hydrogen or lower alkyl;
$R_2$ represents hydrogen, methyl, ethyl, phenyl, p-methoxyphenyl, p-hydroxyphenyl, p-chlorophenyl or p-aminophenyl; and
A represents an alkylene chain having 3 or 4 carbon atoms.

Preferred and advantageous compounds of this invention are represented by the following structural formula:

FORMULA 3

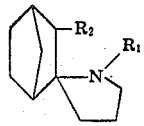

when:

$R_1$ represents hydrogen or methyl, and
$R_2$ represents hydrogen, phenyl, p-methoxyphenyl or p-hydroxyphenyl.

By the term "lower alkyl" where used herein aliphatic groups having a maximum of 4 carbon atoms are indicated. The term "lower alkylene" where used herein in combination with other terms indicates an alkylene chain having from 2 to 4, preferably 2, carbon atoms, the two hetero atoms to which it is attached being separated by at least 2 carbon atoms.

This invention also includes pharmaceutically acceptable salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halo-theophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition this invention includes quaternary ammonium compounds particularly useful as injectible hypotensive agents which are formed by the reaction of the tertiary bases of this invention with at least an equimolar quantity of a reactive lower alkyl ester such as a reactive lower alkyl halide, preferably iodide. The reactants, advantageously in a solvent such as ether or a lower alcohol, for example, methanol or ethanol, are heated together, advantageously at the reflux temperature of the solvent. Evaporation of the reaction mixture and recrystallization of the residue from a suitable solvent such as, for example, an ethanol-ether mixture gives the quaternary ammonium compounds of this invention.

The spiro compounds of this invention are prepared from 2-nitro-bicyclo[2.2.1]hept-5-ene derivatives according to the following synthetic procedure:

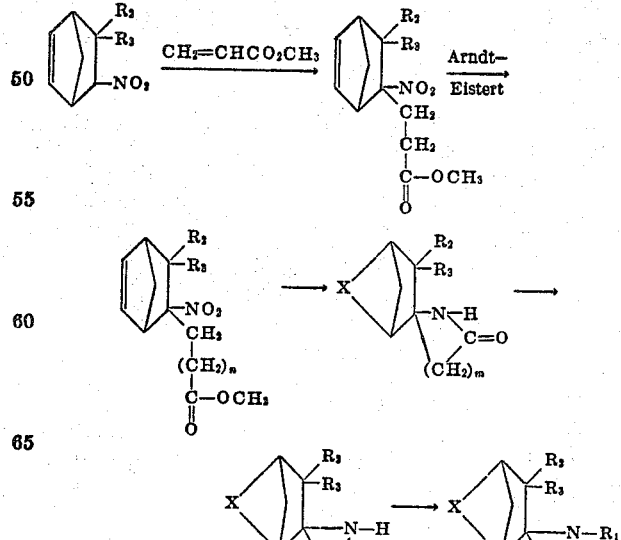

when $n$ represents 2 or 3; $m$ represents 2, 3 or 4; and $R_1$, $R_2$, $R_3$, A and X are as previously defined.

The 2-nitro-bicyclo[2.2.1]hept-5-ene starting material is condensed with a molar equivalent of methyl acrylate in an alcohol solution such as, for example, butanol or isopropanol in the presence of a base such as a quaternary ammonium hydroxide, for example, benzyltrimethyl-ammonium hydroxide. The reaction mixture is advantageously stirred at room temperature for about four to eight hours, diluted with a lower alcohol such as ethanol and neutralized with a dilute mineral acid solution such as dilute hydrochloric acid. The methyl β-(2-nitro-2-bicyclo[2.2.1]hept-5-enyl)-propionate, if a solid, is filtered from the reaction mixture and may be purified by recrystallization from a suitable solvent, such as for example, absolute ethanol. If the ester is a liquid it is extracted into an organic solvent such as ether, and the extracts are concentrated to give the ester as the residue.

To prepare the spiro compounds of this invention in which A is an alkylene group having 4 or 5 carbon atoms, the propionate prepared as above is converted according to the Arndt-Eistert method [Ber., 68:200 (1935)] to the corresponding butyrate or by applying the reactions of the Arndt-Eistert method a second time to the valerate. Briefly, the Arndt-Eistert method for converting an acid to its next higher homolog involves the following steps: (1) conversion of the acid (obtained by hydrolysis of the propionate) to the acid chloride, (2) reaction of the acid chloride with diazomethane and (4) treatment of the thus prepared diazoketone with silver oxide in ethanol to obtain the ethyl ester of the next higher homolog of the acid starting material.

Reduction and cyclization of the nitro ester compounds, prepared as described above is accomplished by catalytic hydrogenation in an alcohol solution, such as ethanol using a catalyst such as, for example, Raney nickel when the desired compound is a norcamphane derivative. When it is desired to retain the double bond in the bicyclo[2.2.1]hept-5-ene nucleus, reduction is accomplished by use of chemical reducing agents such as, for example, with tin and acetic acid. Advantageously, the mixture is heated at reflux in a lower alcohol such as methanol or ethanol after the reaction mixture is freed of catalyst (and neutralized when chemical reduction has been used).

Reduction of the thus formed spiralactam is advantageously carried out with a bimetallic hydride such as with an alkali metal hydride reducing agent such as, for example, lithium aluminum hydride, or sodium aluminum hydride. The spirolactam in an inert solvent in which the reactants are substantially soluble such as, for example, tetrahydrofuran, dioxane or ether is added slowly to an excess of the alkali metal hydride in the same solvent, preferably in tetrahydrofuran solution, and the resulting mixture is heated at reflux for about 10 to 20 hours. The mixture is diluted with an organic solvent such as ether, then treated with water. Filtering the mixture, extracting the solid material with acetone, combining the filtrate and the extracts, concentrating and distilling gives the N-unsubstituted spironorcamphanes of this invention.

The N-substituted spiro[bicyclo[2.2.1]heptane-2,2′-alkylenimines] of this invention are prepared by a number of alkylation procedures utilizing various reactive esters depending upon the N-substituent desired. For example, N-methylation is conveniently carried out by adding the spiro compound to an excess of formic acid, treating the resulting mixture with an aqueous solution of formaldehyde and heating the mixture at reflux for about 4 to 8 hours. Concentrated hydrochloric acid is added, the excess formic acid and formaldehyde are removed in vacuo, and the residue is made basic with dilute alkali metal hydroxide, for example, sodium or potassium hydroxide. The organic layer is separated and extracted with an inert organic solvent such as ether or benzene. The extracts are dried over a drying agent such as, for example, magnesium or sodium sulfate, concentrated and distilled in vacuo to obtain the N-methyl-spiro[bicyclo[2.2.1]heptane - 2,2′ - alkylenimine] compound.

N-alkylation or N-arylalkylation is accomplished by refluxing the spiro compound in an inert solvent such as benzene or toluene with at least one equivalent of a reactive alkyl or arylalkyl ester, for example, the sulfonate ester or the halide, preferably the bromide or chloride, in the presence of a base such as an alkali metal carbonate, for example, sodium or potassium carbonate. The N-alkylspiro or N-aralkylspiro[bicyclo[2.2.1]heptane-2,2′-alkylenimine] is isolated, preferably, by treating the cooled reaction mixture with water, extracting the organic layer with dilute acid, preferably hydrochloric acid, neutralizing the acid extracts, extracting with benzene and concentrating the benzene extracts to give the desired compound.

Alternatively, N-alkylation is carried out by refluxing the spiro compound with at least one equivalent of the appropriate acid chloride or acid anhydride and subsequent reduction of the resulting amide with an alkali metal hydride such as lithium aluminum hydride.

The N-ω-hydroxyalkyl derivative is prepared by treating the spiro compound with an alkylene chlorohydrin or, to prepare the hydroxyethyl derivative, with ethylene oxide. The N-ω-hydroxyalkyl derivative is used to prepare the N-ω-chloroalkyl compound by treatment with a chlorinating agent such as, for example, hydrochloric acid or thionyl chloride; the N-ω-bromoalkyl compound by treatment with a brominating agent such as, for example, hydrobromic acid or phosphorous tribromide, and the N-ω-acetoxyalkyl compound by treatment with an acetylating agent, for example, acetyl chloride.

The 2-nitrobicyclo[2.2.1]hept-5-ene starting materials are prepared according to the following procedure:

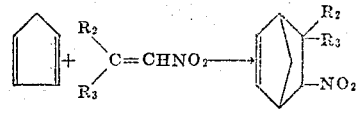

The unsaturated nitro compound is refluxed with an excess of cyclopentadiene for about three to six hours. Alternatively, the reactants may be heated in a bomb at about 125° to about 175° C. with an inert solvent such as xylene or toluene. The excess cyclopentadiene is removed in vacuo and the residue is distilled to give the 2-nitrobicyclo[2.2.1]hept-5-ene starting material.

Certain intermediates in the preparation of the novel compounds of this invention are also novel. These novel intermediates are represented by the following structural formulas:

FORMULA 4

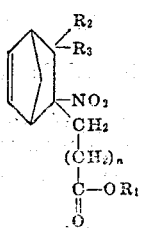

when:

$R_1$ represents lower alkyl;

$R_2$ and $R_3$ represent hydrogen, methyl, ethyl, cyclopentyl, cyclohexyl, phenyl, methoxyphenyl, hydroxyphenyl, chlorophenyl, aminophenyl or together with the carbon atom to which they are attached form a cyclohexyl or cyclopentyl group; and $n$ represents 1, 2 or 3.

FORMULA 5

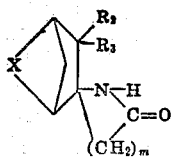

when:

X represents ethylene or vinylene;

$R_2$ and $R_3$ represent hydrogen, methyl, ethyl, cyclopentyl, cyclohexyl, phenyl, methoxyphenyl, hydroxyphenyl, chlorophenyl, aminophenyl or, together with the hydrogen atom to which they are attached form a cyclohexyl or cyclopentyl group; and m represents 2, 3 or 4.

The novel intermediates of this invention may be also broken down into advantageous and preferred subgroups following the manner in which the end products are subclassified herebefore as to X, m, $R_2$ and $R_3$.

The compounds of this invention are presented in generalized structural formulas; however, it will be apparent to one skilled in the art that certain compounds of this invention will exist in cis-trans or optical isomers. Such isomers are considered a part of this invention and are included in the scope of the formulas of the claims.

The following examples are not limiting but are illustrative of compounds of this invention and will serve to make fully apparent all the compounds embraced by the general formula given above.

*Example 1*

To a mixture of 21.5 g. of 2-nitro-3-phenylbicyclo-[2.2.1]hept-5-ene, 10 ml. of t-butanol and 1.5 ml. of a 35% methanol solution of benzyltrimethylammonium hydroxide is added dropwise 8.6 g. of methyl acrylate. The resulting mixture is stirred at room temperature for five hours, then diluted with ethanol and neutralized with dilute hydrochloric acid. The solid material is filtered off and recrystallized from absolute ethanol to give methyl β-(2-nitro-3-phenyl-2-bicyclo[2.2.1]hept-5-enyl)-propionate, M.P. 80–81° C.

Hydrogenation of 10.0 g. of the propionate prepared above is carried out in 110 ml. of ethanol in the presence of 2.0 g. of Raney nickel at 50 lbs. $H_2$ pressure and 50° C. for five hours. The suspension is filtered and the filtrate concentrated and cooled. White crystals which form are filtered off and recrystallized from absolute ethanol to give 3-phenylspiro[bicyclo[2.2.1]heptane-2,2'-pyrrolidin]-5'-one.

A solution of 40.0 g. of the spirolactam prepared as above in 120 ml. of tetrahydrofuran is added dropwise to a suspension of 22.0 g. of lithium aluminum hydride in 100 ml. of tetrahydrofuran. The resulting mixture is refluxed for 18 hours. A mixture of 40 ml. of ethyl acetate and 120 ml. of ether is added followed by 110 ml. of water. The mixture is filtered and the solid material obtained is extracted with acetone. The filtrate and the acetone extracts are combined, concentrated and distilled to give 3-phenylspiro[bicyclo[2.2.1]heptane-2,2'-pyrrolidine], B.P. 150–152° C. (1.2 mm.).

The free base (1.0 g.) in 5 ml. of ether is treated with an excess of ethereal hydrogen chloride. The hydrochloride is filtered off and recrystallized from methanol-ethyl acetate-ether, M.P. 221–222° C.

*Example 2*

To 20.0 g. of 98% formic acid is added 19.0 g. of 3-phenylspiro[bicyclo[2.2.1]heptane - 2,2' - pyrrolidine], made as in Example 1, cooling the mixture in an ice bath. A 37% aqueous solution of formaldehyde (25.0 g.) is added and the resulting mixture is refluxed for six hours. Addition of 15.3 ml. of concentrated hydrochloric acid, evaporation in vacuo of the excess formic acid and formaldehyde and addition of 10% sodium hydroxide solution to make the solution basic caused the separation of an oily layer. Extracting of the oily layer with ether, drying, concentrating and distilling the extracts gives 1'-methyl-3-phenylspiro[bicyclo[2.2.1]heptane-2,2'-pyrrolidine], B.P. 121–125° C. at 0.4–0.6 mm.

A solution of 2.0 g. of the free base in 10 ml. of ether is treated with an equivalent amount of alcoholic maleic acid to give the maleate salt, M.P. 155–156° C., upon concentration and cooling.

*Example 3*

To an ice cold solution of 22.7 g. of 3-phenylspiro-[bicyclo[2.2.1]heptane-2,2'-pyrrolidine] made as in Example 1, in 150 ml. of benzene and 25 ml. of pyrridine is added 12.0 of butyryl chloride in 50 ml. of benzene. The resulting mixture is allowed to stand overnight at room temperature, then filtered. The filtrate is washed with dilute hydrochloric acid and water, dried over anhydrous magnesium sulfate and concentrated in vacuo to give 1'-butyryl-3-phenylspiro[bicyclo[2.2.1]heptane-2,2'-pyrrolidine] as the residue.

A solution of 14.8 g. of 1'-butyryl-3-phenylspiro[bicyclo[2.2.1]heptane-2,2'-pyrrolidine] in 100 ml. of dry ether is added to a mixture of 10.0 g. of lithium aluminum hydride in 150 ml. of dry ether. The resulting mixture is stirred and refluxed for 15 hours. The mixture is decomposed with 50 ml. of water and then filtered. Extraction of the filtrate with dilute hydrchloric acid, treatment of the acid extracts with dilute sodium hydroxide to make the solution basic, extraction with ether, washing of the ether extracts with water, drying over magnesium sulfate and evaporation of the ether leaves 1' - butyl - 3 - phenylspiro[bicyclo[2.2.1] - heptane-2,2'-pyrrolidine] as the residue.

A solution of 1.0 g. of the free base in 15 ml. of ether is treated with an excess of ethereal hydrogen chloride to give the hydrochloride salt.

*Example 4*

A mixture of 22.7 g. of 3-phenylspiro[bicyclo[2.2.1]heptane-2,2'-pyrrolidine], made as in Example 1, 14.0 g. of benzylchloride and 18.0 g. of potassium carbonate in 200 ml. of benzene is refluxed for eight hours. The cooled reaction mixture is poured into water and the organic layer is separated. Upon removal of the dried solvent and distillation in vacuo the product, 1'-benzyl-3-phenylspiro[bicyclo[2.2.1]heptane-2,2'-pyrrolidine] is obtained.

*Example 5*

A mixture of 11.3 g. of 3-phenylspiro[bicyclo[2.2.1]-heptane-2,2'-pyrrolidine], made as in Example 1, 7.7 g. of phenethyl chloride, 9.0 g. of potassium carbonate and 100 ml. of toluene is refluxed for seven hours. The cooled reaction mixture is worked up as in Example 4 to give 1'-phenethyl-3-phenylspiro[bicyclo[2.2.1]heptane-2,2'-pyrrolidine].

A mixture of 1.0 g. of the free base in 15 ml. of ether is treated with an excess of ethereal hydrogen bromide to give the hydrobromide salt.

*Example 6*

A mixture of 11.3 g. of 3-phenylspiro[bicyclo[2.2.1]-heptane-2,2'-pyrrolidine] made as in Example 1, 4.2 g. of allyl chloride and 9.0 g. of potassium carbonate in 100 ml. of benzene is refluxed for eight hours. The cooled reaction mixture is separated, dried and stripped of solvent to give 1'-allyl-3-phenylspiro[bicyclo[2.2.1]-heptane-2,2'-pyrrolidine].

*Example 7*

Ten grams of 3-phenylspiro[bicyclo[2.2.1]heptane-2,2'-pyrrolidine], made as in Example 1, 10.0 g. of cinnamyl bromide and 9.0 g. of potassium carbonate in 150 ml. of toluene are refluxed for six hours. Working up the reaction mixture as in Example 6 gives 1'-cinnamyl-3-phenylspiro[bicyclo[2.2.1]heptane-2,2'-pyrrolidine].

Example 8

A mixture of 11.3 g. of phenylspiro[bicyclo[2.2.1]-heptane-2,2'-pyrrolidine], made as in Example 1, 3.0 g. of ethylene oxide and 35 ml. of methanol is heated at 50° C. for six hours, then allowed to stand at room temperature overnight. Concentration of the reaction mixture in vacuo and distillation of the residue gives 1'-(2 - hydroxyethyl) - 3 - phenylspiro[bicyclo[2.2.1]heptane-2,2'-pyrrolidine].

Example 9

Anhydrous hydrogen chloride is bubbled into a solution of 27.0 g. of 1'-(2-hydroxyethyl)-3-phenylspiro[bicyclo[2.2.1]heptane-2,2'-pyrrolidine], made as in Example 8, in 200 ml. of ethanol until a slight excess is present. The solvent is removed in vacuo. The residue is treated with 200 ml. of chloroform, then 50 g. of thionyl chloride in 100 ml. of chloroform is added slowly. The resulting mixture is refluxed for 12 hours. The solvent and excess thionyl chlorides are removed in vacuo and the residue recrystallized from ethanol-ether to give 1'-(2-chloroethyl)-3-phenylspiro[bicyclo[2.2.1]-heptane-2,2'-pyrrolidine] hydrochloride.

Example 10

To a solution of 2.7 g. of 1'-(2-hydroxyethyl)-3-phenylspiro[bicyclo[2.2.1]heptane-2,2'-pyrrolidine], made as in Example 8, in 100 ml. of benzene is added 0.8 g. of acetyl chloride in 20 ml. of benzene. The resulting mixture is heated at reflux for 30 minutes, cooled and the solvent removed in vacuo to give the residual hydrochloride salt of 1'-(2-acetoxyethyl)-3-phenylspiro[bicyclo[2.2.1]heptane-2,2'-pyrrolidine].

Example 11

A mixture of 2.8 g. of 1'-(2-chloroethyl)-3-phenylspiro[bicyclo[2.2.1]heptane-2,2'-pyrrolidine] hydrochloride, made as in Example 9, and 3.6 of potassium phthalimide is heated at 130–150° C. for two hours. The cooled reaction mixture is washed with 10% sodium hydroxide solution, then with water and extracted with benzene. The benzene extracts are stripped of solvent in vacuo and the residue is refluxed with 50 ml. of 20% aqueous hydrochloric acid solution. After cooling the mixture is neutralized with dilute sodium hydroxide, extracted with benzene and the benzene extracts concentrated to give 1'-(2-aminoethyl)-3-phenylspiro[bicyclo[2.2.1]heptane-2,2'-pyrrolidine] as the residue.

A solution of 1.0 g. of the free base in 25 ml. of acetone is reacted with two molar equivalents of citric acid in acetone to give the crystalline dicitrate salt.

Example 12

Ten grams of 1'-(2-hydroxyethyl)-3-phenylspiro[bicyclo[2.2.1]heptane-2,2'-pyrrolidine], made as in Example 8, is refluxed with 25 g. of 48% hydrobromic acid for four hours. The water is removed in vacuo and the residue washed with ether. Recrystallization from ethanolether yields the hydrobromide salt of 1'-(2-bromoethyl)-3-phenylspiro[bicyclo[2.2.1]-heptane-2,2' - pyrrolidine].

Example 13

Methyl acrylate (8.6 g.) is added dropwise to a mixture of 15.3 g. of 3-methyl-2-nitrobicyclo[2.2.1]hept-5-ene, 25 ml. of t-butanol and 1.5 ml. of a 35% methanol solution of benzyltrimethylammonium hydroxide. The resulting mixture is stirred at room temperature for four hours, then concentrated, neutralized with dilute hydrochloric acid, extracted into ether, filtered and concentrated to give methyl β-(3-methyl-2-nitro-2-bicyclo-[2.2.1]hept-5-enyl)-propionate.

Hydrogenation of the propionate in ethanol using Raney nickel as the catalyst and working up the reaction mixture by filtration, refluxing overnight, concentration, extraction of the residue into ether and concentration of the extracts yields 3-methylspiro[bicyclo[2.2.1]heptane-2,2'-pyrrolidin]-5'-one.

A solution of 25.0 g. of the spirolactam, prepared above, in 100 ml. of tetrahydrofuran is added slowly to a suspension of 18.0 g. of lithium aluminum hydride in 75 ml. of tetrahydrofuran and the resulting mixture is refluxed for 16 hours. Dilution with ether-ethyl acetate, followed by dilution with water, filtration, concentration of the filtrate and distillation gives 3-methylspiro[bicyclo-[2.2.1]heptane-2,2'-pyrrolidine].

Treatment of the free base in ethanol with an excess of hydrogen chloride in ether solution gives the hydrochloride salt.

Example 14

To a mixture of 16.7 g. of 3,3-dimethyl-2-nitrobicyclo[2.2.1]hept-5-ene, 25 ml. of t-butanol and 1.5 ml. of a 35% methanol solution of benzyltrimethylammonium hydroxide is added slowly 8.6 g. of methyl acrylate. The resulting mixture is stirred at room temperature for five hours, concentrated and neutralized with dilute hydrochloric acid. Extraction into ether, filtration and concentration of the extracts gives, as the residue, methyl β-(3,3 - dimethyl - 2 - nitro - 2 - bicyclo - [2.2.1]hept - 5 - enyl)-propionate.

Reduction of 10.0 g. of the propionate is accomplished with 20.0 g. of tin in 300 ml. of glacial acetic acid. The mixture is heated at 100° C. for three hours, then cooled and neutralized with sodium carbonate. Extraction with ether, concentration of the extracts, further extraction with methanol, refluxing the alcohol extracts overnight and concentration in vacuo gives 3,3-dimethylspiro[bicylo-[2.2.1]hept-5-ene-2,2'-pyrrolidin]-5'-one.

The spirolactam is reduced with lithium aluminum hydride in tetrahydrofuran solution as in Example 13 to give 3,3-dimethylspiro-[bicyclo[2.2.1]hept-5-ene-2,2'-pyrrolidine].

Example 15

Methyl acrylate (8.6 g.) is added slowly to a mixture of 16.7 g. of 3-ethyl-2-nitrobicyclo[2.2.1]hept-5-ene, 20 ml. of t-butanol and 1.5 ml. of a 35% methanol solution of benzyltrimethylammonium hydroxide and the resulting mixture is stirred at room temperature for five hours. Working up the reaction mixture as in Example 14 gives methyl β-(3-ethyl-2-nitro-2-bicyclo[2.2.1]hept-5-enyl)-propionate.

Hydrogenation of the propionate in ethanol solution with Raney nickel and working up as in Example 13 gives 3-ethylspiro[bicylo[2.2.1]heptane-2,2'-pyrrolidin]-5'-one.

Reduction of the spirolactam with lithium aluminum hydride in tetrahydrofuran and treating the reaction mixtures as in Example 13 gives 3-ethylspiro-[bicyclo[2.2.1]heptane-2,2'-pyrrolidine].

Example 16

A mixture of 27.2 g. of cyclopentadiene, 35.8 g. of p-(2-nitrovinyl)-anisole, 68 ml. of xylene and 0.5 g. of hydroquinone is heated in a rocking bomb at 135–165° C. for 24 hours. The mixture is concentrated in vacuo and distilled to give 3-(p-methoxyphenyl)-2-nitrobicyclo-[2.2.1]hept-5-ene.

To a mixture of 24.5 g. of 3-(p-methoxyphenyl)-2-nitrobicyclo[2.2.1]hept-5-ene, 15 ml. of t-butanol and 1.5 ml. of a 35% methanol solution of benzyltrimethylammonium hydroxide is added dropwise 9.0 g. of methyl acrylate. The reaction mixture is stirred at room temperature for five hours, concentrated, neutralized with dilute hydrochloric acid and extracted into ether. The ether extracts are treated with charcoal, then filtered, dried and evaporated to give, as the residue, methyl β-[3-(p-methoxyphenyl)-2-nitro-2-bicyclo[2.2.1]hept-5-enyl]-propionate.

A mixture of 5.0 g. of the above propionate, 1.5 g. of Raney nickel and 60 ml. of ethanol is hydrogenated at 50° C. for five hours at 50 lbs. of hydrogen pressure. The mixture is filtered, refluxed overnight and concentrated in vacuo. The residue is extracted into ether, the extracts are dried over magnesium sulfate and concentrated to give 3-(p-methoxyphenyl)-spiro[bicyclo[2.2.1]-heptane-2,2'-pyrrolidin]-5'-one.

This spirolactam (10.0 g.) in 75 ml. of tetrahydrofuran is added dropwise to 6.0 g. of lithium aluminum hydride in 25 ml. of tetrahydrofuran and the resulting mixture is refluxed for 18 hours. Ethyl acetate (20 ml.) and ether (60 ml.) are added followed by 55 ml. of water. The mixture is filtered. The filtrate is concentrated in vacuo and distilled to give 3-(p-methoxypheny)-spiro[bicyclo-[2.2.1]heptane-2,2'-pyrrolidine], B.P. 160° C. at 0.8 mm.

The free base (1.0 g.) in 75 ml. of ethanol is treated with a molar equivalent of alcoholic maleic acid to give the maleate salt (M.P. 130° C.) upon concentration and cooling.

Example 17

Ten grams of 3-(p-methoxyphenyl)-spiro[bicyclo-[2.2.1]heptane-2,2'-pyrrolidine], made as in Example 16, is refluxed in 100 ml. of 48% hydrobromic acid for six hours. The excess hydrobromic acid is removed in vacuo and the residue is recrystallized from ethanol-ether to give the hydrobromide salt of 3-(p-hydroxyphenyl)-spiro-[bicyclo[2.2.1]heptane-2,2'-pyrrolidine].

The hydrobromide salt in ethanol solution is neutralized with dilute sodium hydroxide and extracted with benzene. The benzene extracts are concentrated in vacuo to give 3-(p-hydroxyphenyl)-spiro[bicyclo[2.2.1]heptane-2,2'-pyrrolidine] as the residue.

Example 18

A mixture of 25.0 g. of methyl β-(2-nitro-3-phenyl-2-bicyclo[2.2.1]hept-5-enyl)-propionate (made as in Example 1) and 10.0 g. of sodium hydroxide is refluxed in 250 ml. of water for ten hours. After cooling, the solution is acidified with hydrochloric acid and the β-(2-nitro-3-phenyl-2-bicyclo[2.2.1]hept-5-enyl)-propionic acid is isolated by extraction into ether and concentration of the extracts.

Twenty grams of this propionic acid is refluxed with 120 ml. of thionyl chloride for four hours. The excess thionyl chloride is removed in vacuo. The residue is taken up in ether and treated with 10.0 g. of diazomethane in ether solution. The resulting mixture is allowed to stand overnight and the ether is removed in vacuo. Ethanol (200 ml.) is added and the resulting mixture is heated to reflux. A slurry of silver oxide in ethanol is added over a 48 hour period. The mixture is filtered and the filtrate distilled to give ethyl γ-(2-nitro-3-phenyl-2-bicyclo[2.2.1]hept-5-enyl)-butyrate.

The butyrate (10.0 g.) is hydrogenated in 120 ml. of ethanol with 2.0 g. of Raney nickel at 50 lbs. hydrogen pressure at 50° C. for five hours. The suspension is filtered and the filtrate is refluxed overnight, concentrated and extracted into ether. The ether extracts are dried over magnesium sulfate and concentrated to give 3-phenyl-spiro-[bicyclo[2.2.1]heptane-2,2'-piperidin]-6'-one.

The spirolactam is reduced with lithium aluminum hydride in tetrahydrofuran solution as described in Example 1 to give 3-phenylspiro[bicyclo[2.2.1]heptane-2,2'-piperidine].

Example 19

A sample of 10.0 g. of ethyl γ-(2-nitro-3-phenyl-2-bicyclo[2.2.1]hept-5-enyl)-butyrate, made as in Example 18, is converted to the acid and then refluxed with 75 ml. of thionyl chloride for four hours. The excess thionyl chloride is removed in vacuo and the residue is taken up in 100 ml. of ether and treated with 6.0 g. of diazomethane in ether solution. After standing overnight, the solution is freed of ether, diluted with 100 ml. of ethanol and the resulting mixture heated to reflux. A slurry of silver oxide in ethanol is added over a 48 hour period. The mixture is filtered and the filtrate distilled to give ethyl δ-(2nitro-3-phenyl-2-bicyclo[2.2.1]hept-5-enyl)-valerate.

The valerate (7.0 g.) is hydrogenated in 100 ml. of ethanol with 1.2 g. of Raney nickel at 60 lbs. hydrogen pressure at 50° C. for four hours. The catalyst is removed by filtration and the filtrate is refluxed overnight. The ethanol is evaporated in vacuo and the residue is extracted into ether. The extracts are dried and concentrated to give 3-phenylspiro[bicyclo[2.2.1]heptane-2,2'-hexamethylenimin)-7'-one.

The spirolactam is reduced with lithium aluminum hydride in tetrahydrofuran solution as in Example 1 to give 3 - phenylspiro[bicyclo[2.2.1]heptane - 2,2' - hexamethylenimine].

Example 20

A mixture of 18.3 g. of o-chloro-β-nitrostyrene and 13.2 g. of cyclopentadiene is refluxed for five hours. Excess cyclopentadiene is evaporated in vacuo and the residue distilled to give 3-(o-chlorophenyl)-2-nitrobicyclo[2.2.1]-hept-5-ene.

Methyl acrylate (8.6 g.) is added dropwise to a mixture of 24.9 g. of 3-(o-chlorophenyl)-2-nitrobicyclo-[2.2.1]hept-5-ene, 20 ml. of t-butanol and 1.5 ml. of a 35% methanol solution of benzyltrimethylammonium hydroxide. The resulting mixture is stirred at room temperature for five hours, then worked up as in Example 16 to give methyl β-[3-(o-chlorophenyl)-2-nitro-2-bicyclo [2.2.1]hept-5-enyl]-propionate.

This propionate (10.0 g.) is hydrogenated in 100 ml. of ethanol with 1.5 g. Raney nickel at 40° C. for six hours at 50 lbs. of hydrogen pressure. The mixture is filtered; the filtrate is refluxed overnight, then concentrated in vacuo and worked up as in Example 19 to give 3-(o-chlorophenyl) - spiro - [bicyclo[2.2.1]heptane-2,2'-pyrrolidin]-5'-one.

The spirolactam is reduced with lithium aluminum hydride in tetrahydrofuran solution to give 3-(o-chlorophenyl)-spiro[bicyclo[2.2.1]heptane-2,2'-pyrrolidine].

Example 21 p,β-Dinitrostyrene (26.0 g.) and 13.2 g. of cyclopentadiene are refluxed for five hours. The excess cyclopentadiene is evaporated in vacuo and the residue distilled to give 2-nitro-3-(p-nitrophenyl)-bicyclo[2.2.1]-hept-5-ene.

This compound, in a mixture with t-butanol and benzyltrimethylammonium hydroxide is treated with methyl acrylate. Working up as in Example 16 gives methyl β-[2-nitro-3-(p-nitrophenyl) - 2 - bicyclo[2.2.1]hept - 5-enyl]-propionate.

The propionate (8.0 g.) is hydrogenated in 80 ml. of ethanol with 1.2 g. of Raney nickel at 50° for five hours at 50 lbs. of hydrogen pressure. The mixture is filtered and the filtrate is refluxed overnight, then concentrated. Extraction into ether and concentration of the ether extracts gives 3-(p-aminophenyl)-spiro[bicyclo[2.2.1]heptane-2,2'-pyrrolidin]-5'-one.

A solution of 10.0 g. of the spirolactam, prepared above, in 75 ml. of tetrahydrofuran is added dropwise to a suspension of 10.0 g. of lithium aluminum hydride in 50 ml. of tetrahydrofuran and the resulting mixture is refluxed for 20 hours. Ethyl acetate (15 ml.) and 30 ml. of ether is added followed by 50 ml. of water. The mixture is filtered and the solid material obtained is extracted with acetone. The filtrate and the acetone extracts are combined, concentrated and distilled to give 3-(p-aminophenyl)-spiro[bicyclo-[2.2.1]heptane-2,2' - pyrrolidine].

Example 22

A mixture of 61.0 g. of nitromethane dissolved in a solution of 12.0 g. of sodium hydroxide in 200 ml. of water and 112.0 g. of cyclohexanecarboxaldehyde is added to a solution of 104.0 g. of sodium bisulfite in 500 ml. of water. The resulting mixture is heated on a steam bath for four hours. The organic layer is separated and distilled to give 1-cyclohexyl-2-nitroethanol.

Acetic anhydride (10.2 g.) is added slowly to a mixture of 17.3 g. of 1-cyclohexyl-2-nitroethanol and 0.5 g. of concentrated sulfuric acid and the resulting mixture is kept at 60° C. for one hour. Distillation of the mixture gives β-nitrovinylcyclohexane.

A mixture of 15.5 g. of β-nitrovinylcyclohexane and 13.2 g. of cyclopentadiene is refluxed for five hours. The excess cyclopentadiene is evaporated in vacuo and the residue distilled to give 3 - cyclohexyl - 2 - nitrobicyclo-[2.2.1]hept-5-ene.

Methyl acrylate (8.6 g.) is added dropwise to a mixture of 22.1 g. of 3-cyclohexyl-2-nitrobicyclo[2.2.1]-hept-5-ene, 20 ml. of t-butanol and 1.5 ml. of a 35% methanol solution of benzyltrimethylammonium hydroxide. Stirring the resulting mixture at room temperature for five hours and working it up as in Example 16 gives methyl β-[3-cyclohexyl-2-nitro - 2 - bicyclo[2.2.1]hept-5-enyl]-propionate.

The propionate prepared above (10.0 g.) is hydrogenated in 100 ml. of ethanol with 1.0 g. of Raney nickel at 50° C. for five hours at 45 lbs. of hydrogen pressure. The mixture is filtered and the filtrate is refluxed overnight, then concentrated in vacuo. The residue is extracted into ether and the ether extracts are dried and concentrated to give 3-cyclohexyl-spiro[bicyclo[2.2.1]heptane-2,2'-pyrrolidin]-5'-one.

A solution of 10.0 g. of the spirolactam prepared above in 60 ml. of tetrahydrofuran is added slowly to a suspension of 6.0 g. of lithium aluminum hydride in 50 ml. of tetrahydrofuran and the resulting mixture is refluxed for 17 hours. Working up the reaction mixture as in Example 21 gives 3-cyclohexyl-spiro[bicyclo[2.2.1]heptane-2,2'-pyrrolidine].

*Example 23*

A mixture of 12.2 g. of nitromethane (in a solution of 2.4 g. of sodium hydroxide in 50 ml. of water) and 20.6 g. of cyclopentanecarboxaldehyde is added to a solution of 20.8 g. of bisulfite in 100 ml. of water. The resulting mixture is heated on a steam bath for five hours. Separation and distillation of the organic layer gives 1-cyclopentyl-2-nitroethanol.

To a mixture of 15.9 g. of 1-cyclopentyl-2-nitroethanol and 0.5 g. of concentrated sulfuric acid is added slowly 10.2 g. of acetic anhydride and the temperature of the resulting mixture is held at 55–60° C. for one hour. Distillation of the mixture gives β-nitrovinylcyclopentane.

Cyclopentadiene (26.4 g.) and 28.2 g. of β-nitrovinylcyclopentane are refluxed for six hours. Evaporation of excess cyclopentadiene and distillation of the residue gives 3-cyclopentyl-2-nitrobicyclo[2.2.1]hept-5-ene. This compound is condensed with methyl acrylate as in Example 22 to give methyl β-[3-cyclopentyl-2-nitro-2-bicyclo-[2.2.1]hept-5-enyl]-propionate.

The propionate (6.0 g.) is hydrogenated in 60 ml. of ethanol for six hours at 50 lbs. of hydrogen pressure at 50° C. with 0.8 g. of Raney nickel as catalyst. The mixture is filtered. The filtrate is refluxed for 15 hours, then concentrated in vacuo and worked up as in Example 22 to give 3-cyclopentyl-spiro[bicyclo[2.2.1]heptane-2,2'-pyrrolidin]-5'-one.

The spirolactam is reduced with lithium aluminum hydride in tetrahydrofuran solution as in Example 22 to give 3-cyclopentyl-spiro[bicyclo[2.2.1]heptane-2,2'-pyrrolidine].

*Example 24*

A mixture of 28.4 g. of cyclohexylidenenitromethane (prepared as in C.A., 52: 9977¹ (1958) by reacting 1-nitromethylcyclohexanol with acetyl chloride in chloroform solution to give 1-(nitromethyl)-cyclohexyl acetate which is then warmed in benzene solution with piperidine for 6 hours and the resulting solution is evaporated, extracted with ether and distilled to give cyclohexylidenenitromethane) and 26.4 g. of cyclopentadiene is refluxed for five hours. Evaporation of the excess cyclopentadiene in vacuo and distillation of the residue gives 2-nitrospiro-[bicyclo[2.2.1]hept-5-ene-3,1'-cyclohexane].

To a mixture of 41.4 g. of 2-nitrospiro[bicyclo[2.2.1]-hept-5-ene-3,1'-cyclohexane], 20 ml. of t-butanol and 3 ml. of a 35% methanol solution of benzyltrimethylammonium hydroxide is added dropwise 17.2 g. of methyl acrylate. The reaction mixture is stirred at room temperature for five hours, then worked up as in Example 16 to give methyl β-{2-nitro-2-spiro[bicyclo[2.2.1]hept-5-ene-3,1'-cyclohexyl]}-propionate.

A mixture of 10.0 g. of the propionate prepared above, 2.0 g. of Raney nickel and 100 ml. of ethanol is hydrogenated at 50° C. at 50 lbs. of hydrogen pressure for five hours. The mixture is filtered, refluxed overnight, and concentrated in vacuo. The residue is worked up as in Example 22 to give dispiro[bicyclo[2.2.1]heptane-3,1'-cyclohexane-2,2''-pyrrolidin]-5''-one.

This dispirolactam is reduced with lithium aluminum hydride in tetrahydrofuran solution and worked up as in Example 16 to give dispiro[bicyclo[2.2.1]heptane-3,1'-cyclohexane-2,2''-pyrrolidine].

The free base (1.5 g.) in 20 ml. of ethanol is treated with an excess of ethereal hydrogen chloride to obtain the hydrochloride salt.

*Example 25*

Cyclopentadiene (13.2 g.) and 12.8 g. of cyclopentylidenenitromethane (prepared from 1-nitromethylcyclopentanol by treating the corresponding acetate with piperidine as in Example 24) are refluxed for four hours. The excess cyclopentadiene is removed in vacuo and the residue distilled to give 2-nitrospiro[bicyclo[2.2.1]hept-5-ene-3,1'-cyclopentane].

Methyl acrylate (8.6 g.) is added dropwise to a mixture of 19.3 g. of 2-nitrospiro[bicyclo[2.2.1]hept-5-ene-3,1'-cyclopentane], 15 ml. of t-butanol and 1.5 ml. of a 35% methanol solution of benzyltrimethylammonium hydroxide and the resulting mixture is stirred for six hours. Working up as in Example 16 gives methyl β-{2-nitro-2-spiro[bicyclo[2.2.1]hept - 5 - ene - 3,1' - cyclopentyl]}-propionate.

This propionate is hydrogenated in 100 ml. of ethanol with 2.5 g. of Raney nickel at 50° C. for five hours. The mixture is filtered, refluxed overnight, concentrated and worked up as in Example 22 to give dispiro[bicyclo-[2.2.1]heptane-3,1'-cyclopentane-2,2''-pyrrolidin]-5''-one.

The dispirolactam (8.0 g), prepared above, in 100 ml. of tetrahydrofuran is added slowly to 5.0 g. of lithium aluminum hydride in 20 ml. of tetrahydrofuran. The resulting mixture is refluxed for 16 hours. Ethyl acetate and ether are added to the reaction mixture, followed by water. Filtration, concentration and distillation of the filtrate gives dispiro[bicyclo[2.2.1]heptane-3,1'-cyclopentane-2,2''-pyrrolidine].

*Example 26*

A mixture of 2.4 g. of 1'-methyl-3-phenylspiro[bicyclo-[2.2.1]heptane-2,2'-pyrrolidine], made as in Example 2, and 2.0 g. of methyl iodide in 25 ml. of ether is allowed to stand at room temperature overnight. Evaporation of the reaction mixture in vacuo, and recrystallization of the residue from ethanol-ether gives the methiodide of 1' - methyl - 3 - phenylspiro[bicyclo[2.2.1]heptane - 2,2'-pyrrolidine].

*Example 27*

A mixture of 2.8 g. of 1'-butyl-3-phenylspiro[bicyclo-[2.2.1]heptane-2,2'-pyrrolidine], made as in Example 3, and 2.0 g. of ethyl iodide in 25 ml. of ether is refluxed for six hours. Evaporation of the mixture and recrystallization of the residue from ethanol-ether gives the ethiodide of 1'-butyl-3-phenylspiro[bicyclo[2.2.1]heptane-2,2'-pyrrolidine].

What is claimed is:
1. A therapeutic chemical compound having the fundamental structural formula:

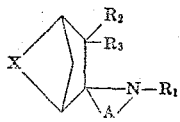

in which X is a member selected from the group consisting of ethylene and vinylene; $R_1$ is a member selected from the group consisting of hydrogen, lower-alkyl, benzyl, phenethyl, allyl, cinnamyl, ω-amino-lower alkylene, ω-hydroxy-lower alkylene, ω-acetoxy-lower alkylene, ω-chloro-lower alkylene and ω-bromo-lower alkylene; $R_2$ and $R_3$ are members selected from the group consisting of hydrogen, methyl, ethyl, cyclopentyl, cyclohexyl, phenyl, methoxyphenyl, hydroxyphenyl, chlorophenyl, aminophenyl and, when taken together with the carbon atom to which they are attached, a cycloalkyl group having 5 to 6 carbon atoms; and A is a straight alkylene chain having 3 to 5 carbon atoms.

2. 3-phenylspiro[bicyclo[2.2.1]heptane-2,2'-pyrrolidine].

3. 3-(p-methoxyphenyl)-spiro[bicyclo[2.2.1]-heptane-2,2'-pyrrolidine].

4. A chemical compound having the structural formula:

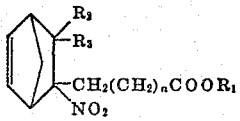

in which $R_1$ is lower alkyl; $R_2$ and $R_3$ are members selected from the group consisting of hydrogen, methyl, ethyl, cyclopentyl, cyclohexyl, phenyl, methoxyphenyl, hydroxyphenyl, chlorophenyl, aminophenyl and, when taken together with the carbon atom to which they are attached, a cycloalkyl group having 5 to 6 carbon atoms and $n$ is an integer selected from the group consisting of 1, 2 and 3.

5. Methyl β-(2-nitro-3-phenyl-2-bicyclo[2.2.1]-hept-5-enyl)-propionate.

6. Methyl β-[3-(p-methoxyphenyl)-2-nitro-2-bicyclo[2.2.1]hept-5-enyl]-propionate.

7. A chemical compound having the structural formula:

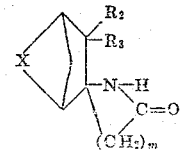

in which X is a member selected from the group consisting of ethylene and vinylene; $R_2$ and $R_3$ are members selected from the group consisting of hydrogen, methyl, ethyl, cyclopentyl, cyclohexyl, phenyl, methoxyphenyl, hydroxyphenyl, chlorophenyl, aminophenyl, and, when taken together with the carbon atom to which they are attached, a cycloalkyl group having 5 to 6 carbon atoms and $m$ is an integer selected from the group consisting of 2, 3 and 4.

8. 3-phenylspiro[bicyclo[2.2.1]heptane-2,2'-pyrrolidin]-5'-one.

9. 3-(p-methoxyphenyl)-spiro[bicyclo[2.2.1]-heptane-2,2'-pyrrolidin]-5'-one.

No references cited.